United States Patent [19]

Matsui et al.

[11] Patent Number: 5,343,184
[45] Date of Patent: Aug. 30, 1994

[54] ELECTRIC NOISE ABSORBER

[75] Inventors: Kazuhiro Matsui; Hiroji Kitagawa, both of Aichi, Japan

[73] Assignee: Kitagawa Industries Co., Ltd., Nagoyashi, Japan

[21] Appl. No.: 962,067

[22] Filed: Oct. 16, 1992

Related U.S. Application Data

[60] Continuation of Ser. No. 669,358, Mar. 14, 1991, abandoned, which is a division of Ser. No. 527,005, May 22, 1990, abandoned.

[30] Foreign Application Priority Data

May 29, 1989 [JP] Japan .................. 1-62227
Nov. 29, 1989 [JP] Japan .................. 1-309958

[51] Int. Cl.$^5$ ............... H01F 17/06; H01F 27/02; H01F 27/26
[52] U.S. Cl. .................. 336/92; 324/127; 333/12; 336/175; 336/176; 336/178; 336/212
[58] Field of Search ............... 174/92, 65 R; 336/174, 336/175, 176, 212, 92, 83, 178; 333/12, 185; 324/127

[56] References Cited

U.S. PATENT DOCUMENTS

| | | | |
|---|---|---|---|
| 1,251,651 | 1/1918 | Espenschied | 336/178 |
| 2,976,502 | 3/1961 | Hill | 336/83 |
| 3,195,086 | 7/1965 | Taylor | 336/178 |
| 3,663,913 | 5/1972 | Kato et al. | 336/83 |

FOREIGN PATENT DOCUMENTS

| | | | |
|---|---|---|---|
| 257179 | 3/1988 | European Pat. Off. | 336/175 |
| 54-114716 | 9/1979 | Japan | 336/83 |
| 1-284574 | 11/1989 | Japan | 336/178 |
| 0363606 | 12/1931 | United Kingdom . | |
| 0624767 | 6/1949 | United Kingdom . | |
| 0755769 | 8/1956 | United Kingdom . | |
| 2201840 | 7/1988 | United Kingdom . | |
| 2201554 | 9/1988 | United Kingdom . | |
| 2205199 | 11/1988 | United Kingdom . | |

*Primary Examiner*—Thomas J. Kozma
*Attorney, Agent, or Firm*—Tarolli, Sundheim & Covell

[57] ABSTRACT

An electric noise absorber comprising at least two ferrite pieces having abutting planes, at least two case members containing the ferrite pieces respectively and being closed by means of engagement members, and a spring member provided in at least one of the case members for pressing the ferrite pieces against each other when the case members are closed. Since the case members for keeping the ferrite pieces in appropriate positions and the spring member for pushing up the ferrite pieces for close contact are separately molded, the case members are bestowed with strength and the spring member with elasticity, both suitable for their own purposes. The case members requires no apertures for biasing members and therefore outside magnetic substance is prevented from contacting with the ferrite pieces contained in the case members.

Another type of electric noise absorber comprising longitudinally divided pieces of magnetic substance shaped to surround the periphery of an electric cable when closed, and magnetic fluid applied to at least one of abutting planes of the divided pieces for securely contacting the abutting planes with each other. Even if the abutting planes are rough and/or are not exactly horizontal surfaces, the magnetic fluid allows the ferrite pieces to be closed with no gaps between them. Consequently, the ferrite pieces keep substantially as low impedance as that of a non-divided ferrite piece.

6 Claims, 9 Drawing Sheets

FIG. 3C
FIG. 3A
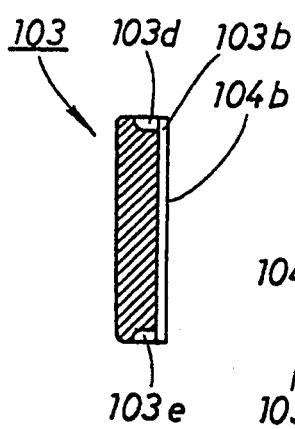
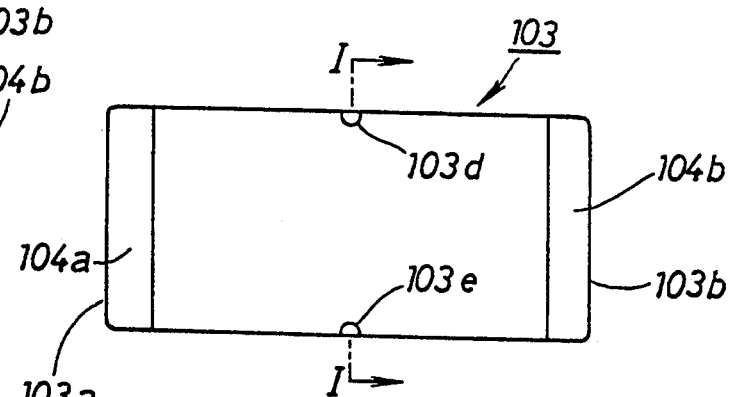
FIG. 3B
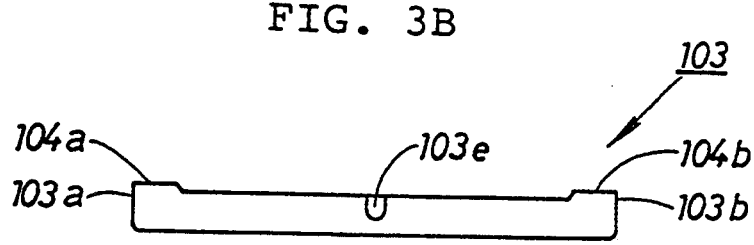
FIG. 3D
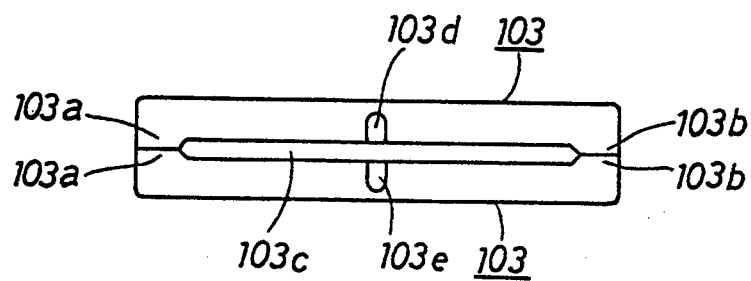

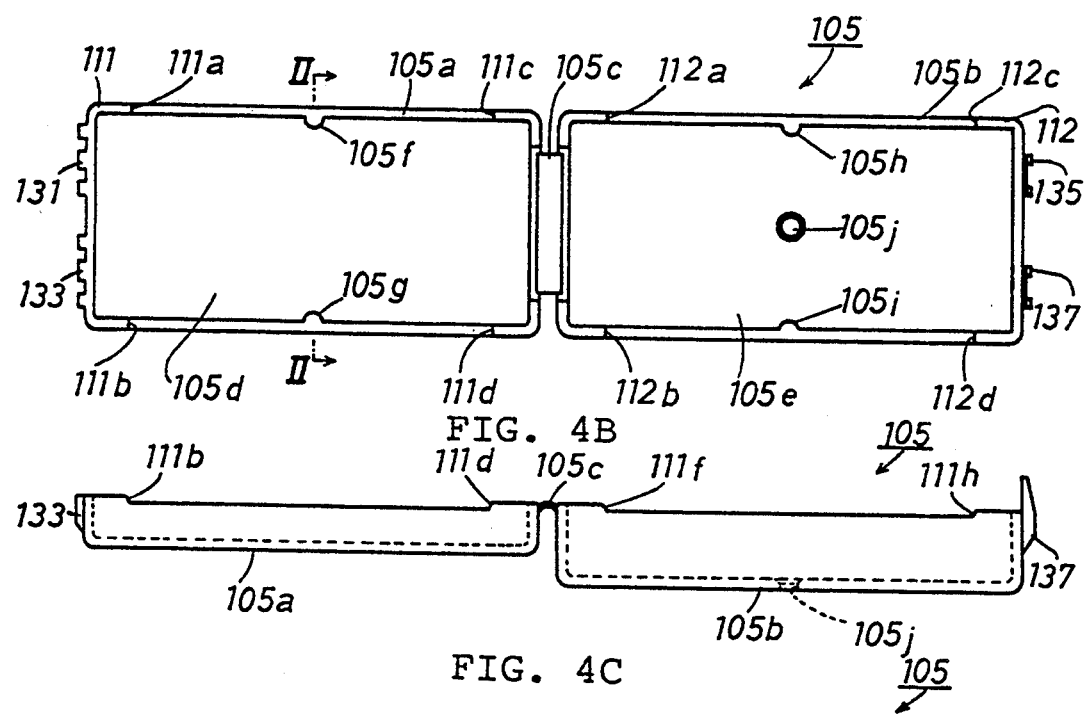
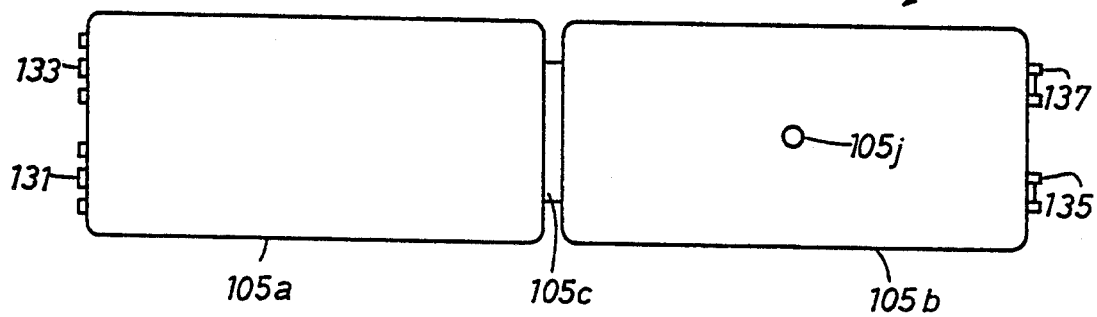
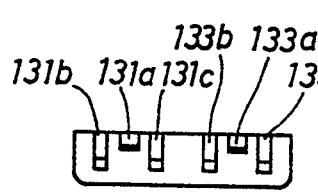 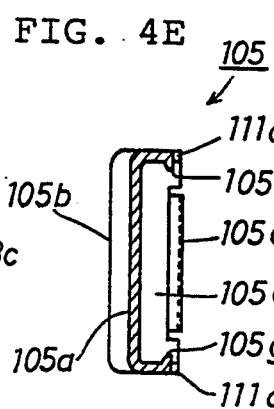 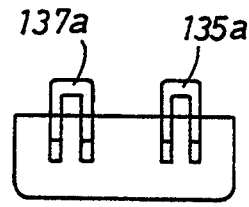

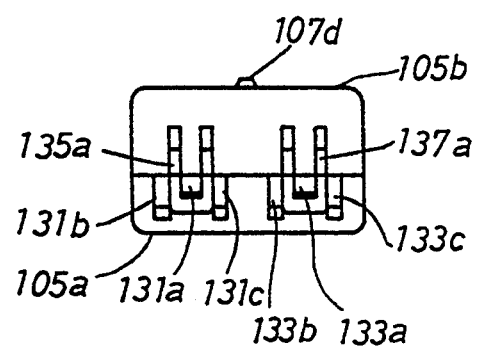
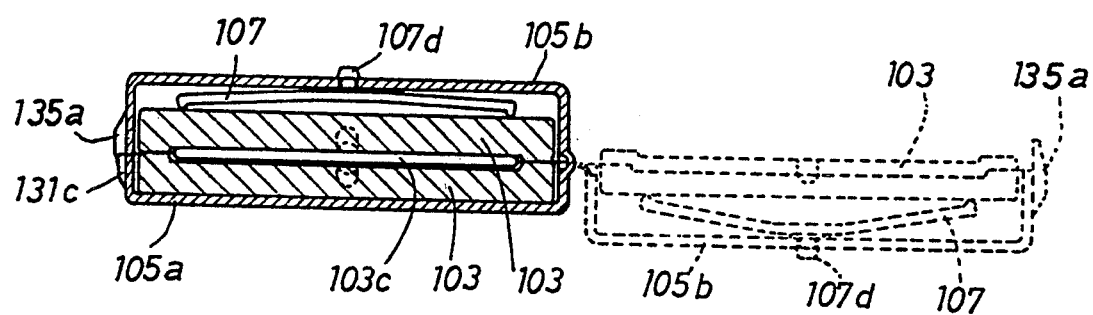

ELECTRIC NOISE ABSORBER

This is a continuation of copending application(s) Ser. No. 07/669,358 now abandoned, filed on Mar. 3, 1991, which is a division of application Ser. No. 527,005, now abandoned, filed on May 22, 1990.

BACKGROUND OF THE INVENTION

This invention relates to an electric noise absorber which electromagnetically shields an electric cable of an electronic device or the like and attenuates electric noise on the electric cable.

Electric noise entering an electronic device from the outside via an input electric cable and/or an output electric cable or generating from the electronic device may cause malfunctions of the electronic device or give adverse effect to other devices. To solve these problems, electric noise absorbers for electromagnetically shielding the input electric cable and/or the output electric cable are employed.

In conventional electric noise absorbers, a magnetic substance surrounding the input electric cable and/or the output electric cable absorbs and reflects electric noise transmitted along the input electric cable and/or the output electric cable, thus preventing interference by leakage of the electric noise.

Japan Published Examined Utility Model Application No. S62-14770 proposes such an electric noise absorber. A pair of ferrite pieces shaped to surround an electric cable are accommodated in a case member and the electric noise absorber is fitted onto the electric cable by means of engagement members. The ferrite pieces have to be closely connected to each other at their abutting planes in order efficiently to electromagnetically shield the electric cable. Accordingly, the electric noise absorber is constructed to press the ferrite pieces against each other due to the elasticity of the case members.

However, it is difficult to endow the case members of the electric noise absorber with two incompatible properties strength for securely holding the ferrite pieces and elasticity for sufficiently pressing the ferrite pieces. Therefore, Japan Published Unexamined Utility Model Application No. S63-39997 discloses a case member having an aperture at its bottom. As shown in FIG. 1, a biasing member 45 is integrally molded in an aperture 43 at a bottom 41 of a case member 49. A tip 47 of the biasing member 45 pushes up an underside of a ferrite piece contained in the case 49, thus applying a force to the ferrite piece.

Yet, another magnetic substance outside of the case 49 may possibly come in contact with the ferrite piece through the aperture 43. When this happens, the whole magnetic circuit of the ferrite pieces is deformed and thus the ferrite pieces less efficiently absorb and reflect the electric noise. Consequently, the electric noise may enter or leak from the electronic device.

Another conventional electric noise absorber comprises a pair of magnetic ferrite pieces, which form a rectangular plate, a cylinder, or the like when combined with each other at abutting planes. The abutting planes extend in the longitudinal direction parallel to an electric cable of an electronic device.

At the center of the abutting planes of half rectangular-plate ferrite pieces, longitudinally extending grooves are provided. The grooves are semicircular in cross section with slightly larger diameters than that of the electric cable. When closed, the ferrite pieces form a receiving hole through which the electric cable passes. In the same way, semi-cylindrical ferrite pieces form a receiving hole whose diameter is also slightly larger than that of the electric cable.

The ferrite pieces are accommodated in an openable case, and the case is closed such that the ferrite pieces surround the electric cable. Alternatively the ferrite pieces may be directly installed on the electric cable with adhesive tape. Consequently, a magnetic circuit with low impedance is formed on the closely connected ferrite pieces.

However, since ferrite is hard and difficult to be cut, the surfaces of the ferrite pieces tend to be rough and are not exactly horizontal surfaces. Therefore, sometimes the ferrite pieces may not be securely kept in close contact with each other. To solve the problem, the abutting planes of the ferrite pieces are expensively polished with diamond abrasive grains.

SUMMARY OF THE INVENTION

A first object of the present invention is to provide a strongly constructed electric noise absorber that is provided with a spring member for pressing ferrite pieces against each other and therefore requires no biasing members and apertures.

A second object of the invention is to provide an electric noise absorber in which whole abutting planes of ferrite pieces are closely contacted with each other when a case is closed and thus low impedance is maintained.

The first object is achieved by an electric noise absorber comprises a magnetic substance composed of at least two divided pieces that surrounds an electric cable when closed at abutting planes, at least two case members that accommodate the divided pieces respectively and are closed by means of engagement means, and a spring member provided in at least one of the case members for pressing one of the divided pieces against the other divided pieces when the case members are closed.

In the electric noise absorber, the case members for accommodating the divided magnetic pieces and the spring member for pressing the divided magnetic pieces are separately molded. Accordingly, the case members are endowed with appropriate strength and the spring member with suitable elasticity, respectively. Since apertures are not formed in the case members, outside magnetic substances never contact the magnetic substance contained in the case members.

The second object is achieved by an electric noise absorber for absorbing electric noise on an electric cable of an electronic device, which comprises longitudinally divided magnetic substance formed to surround the periphery of the electric cable, and magnetic fluid spread on abutting planes of at least one of the divided magnetic substance.

In the electric noise absorber, the ferrite pieces, which contained in a case and installed to an electric cable or alternatively are attached to the electric cable with adhesive tape, are contacted to each other via the magnetic fluid. Therefore, the abutting planes of the ferrite pieces are kept in close contact with each other even if the abutting planes are rough and/or are not accurately horizontal surfaces. The electric noise absorber effectively attenuates electric noise and is bestowed with as low impedance as that of a non-divided ferrite piece.

BRIEF DESCRIPTION OF THE DRAWINGS

FIG. 3A is a plan view of a ferrite piece of the electric noise absorber shown in FIG. 2;

FIG. 3B is a front view of the ferrite piece shown in FIG. 3A;

FIG. 3C is a cross-sectional view of the ferrite piece taken on line I—I in FIG. 3A;

FIG. 3D is a front view of the ferrite pieces shown in FIG. 3A in the closed state;

FIG. 4A is a plan view of a case of the electric noise absorber for the first embodiment;

FIG. 4B is a front view of the case shown in FIG. 4A;

FIG. 4C is a bottom plan view of the case shown in FIG. 4A;

FIG. 4D is a left end view of the case shown in FIG. 4A;

FIG. 4E is a cross-sectional view of the case taken on line II—II in FIG. 4A;

FIG. 4F is a right end view of the case shown in FIG. 4A:

FIG. 6A is a vertical cross-sectional view of the case containing the ferrite pieces and the spring member of the electric noise absorber for the first embodiment;

FIG. 6B is a left side view of the case in the closed state;

DETAILED DESCRIPTION OF THE PREFERRED EMBODIMENTS

First Embodiment

Figure 1:
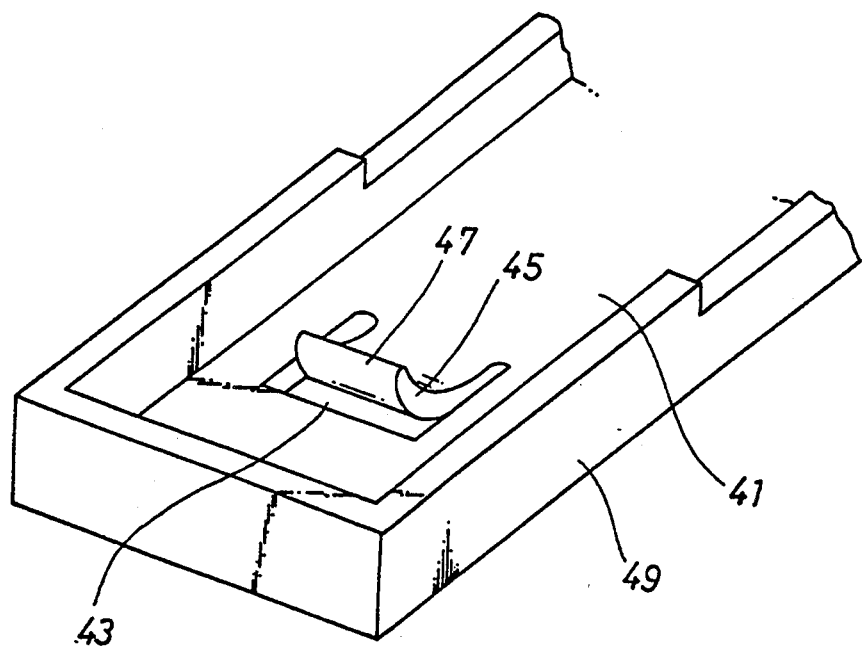
FIG. 1 is a partial and perspective view of a prior-art electric noise absorber.
Figure 2:
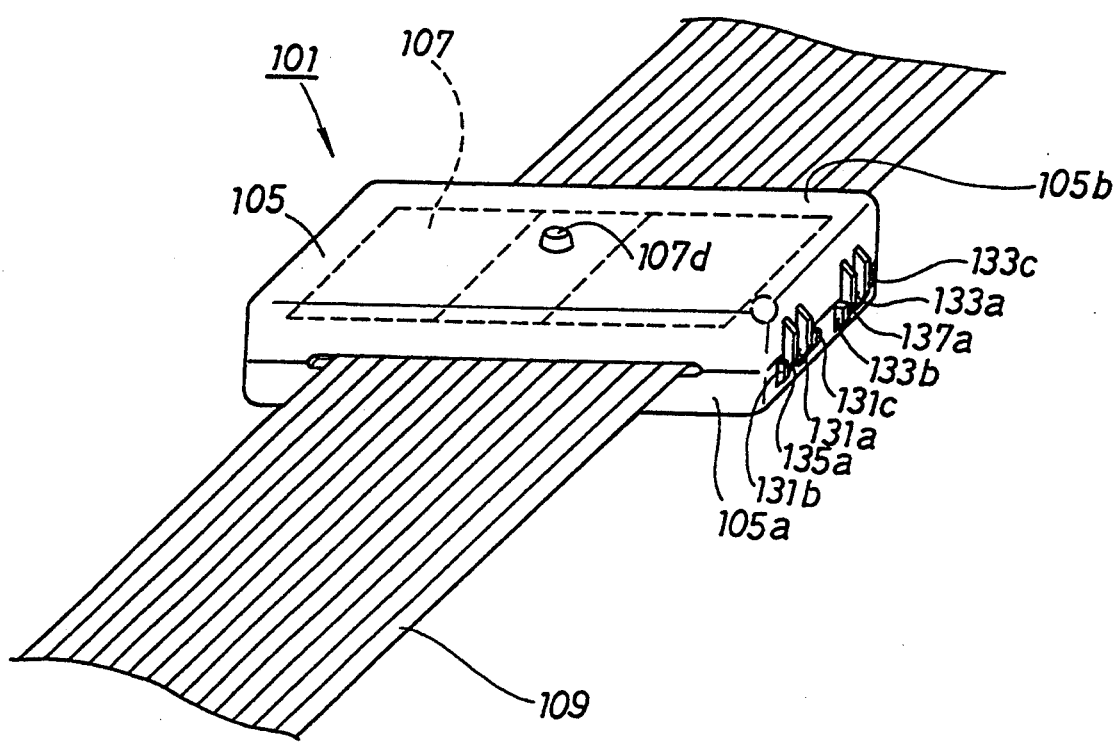
FIG. 2 is a perspective view of an electric noise absorber for a first embodiment.

FIG. 2 is a perspective view of a noise absorber 101 of the first embodiment. The noise absorber 101 comprises a ferrite piece 103 as magnetic substance, a case 105, and a spring member 107.

As shown in FIGS. 3A through 3D, each ferrite piece 103 is a rectangular board. Both ends of the ferrite piece 103 are raised to form a pair of abutting portions 103a and 103b. The top surfaces of the abutting portions 103a and 103b are abutting planes 104a and 104b. The abutting planes 104a and 104b of one of the ferrite pieces 103 abut the abutting planes 104a and 104b of the other ferrite piece 103. When the two ferrite pieces 103 contact as shown in FIG. 3D, a slit 103c through which a flat cable 109 passes is formed.

The case 105 shown in FIGS. 4A through 4F comprises a pair of case members 105a and 105b connected by a hinge 105c. The case members 105a and 105b form a flat rectangular parallelopiped when closed. Accommodation spaces 105d and 105e encircled by peripheral walls 111 and 112, respectively, accommodate the ferrite pieces 103. Positioners 105f, 105g, 105h and 105i are provided at the inner surfaces of the longer edges of the peripheral walls 111 and 112. The positioners 105f through 105i engage with corresponding notches 103d and 103e provided at the longer edges of the ferrite pieces 103 so as to secure the ferrite pieces 103 at proper positions. A fixing hole 105j for fixing the spring member 107 is formed at the center of the case member 105b.

Middle portions of the longer edges of the peripheral walls 111 and 112 of the case members 105a and 105b are lower than end portions of the same longer edges. Steps 111a, 111b, 111c, and 111d and steps 112a, 112b, 112c, and 112d separate the middle portions and the end portions of the peripheral walls 111 and 112, respectively.

The case member 105a is provided with a pair of engaged members 131 and 133 at an end opposite to the hinge 105c, and the case member 105b is provided with a pair of engaging members 135 and 137 at an end opposite to the hinge 105c. The engaged member 131 comprises a holding piece 131a and a pair of guide pieces 131b and 131c, and the other engaged member 133 comprises a holding piece 133a and a pair of guide pieces 133b and 133c. Engaging loops 135a and 137a are provided on the engaging members 135 and 137, respectively. When the case 105 is closed, as shown in FIG. 6A, the engaging loops 135a and 137a climb over the holding pieces 131a and 133a and engage with the holding pieces 131a and 133a. The engaged members 131 and 133 and the engaging members 135 and 137 in the engagement state are shown in FIG. 6B.

Figure 5A:
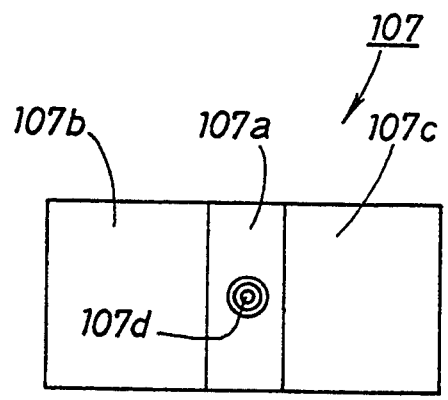
FIG. 5A is a plan view of a spring member of the electric noise absorber for the first embodiment.
Figure 5B:
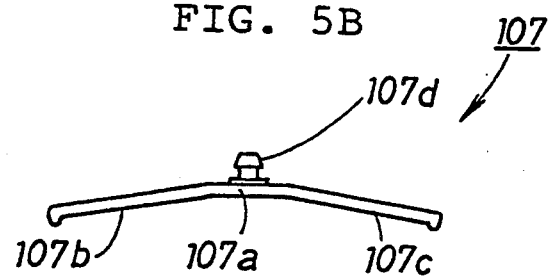
FIG. 5B is a front view of the spring member shown in FIG. 5A.
Figure 5C:
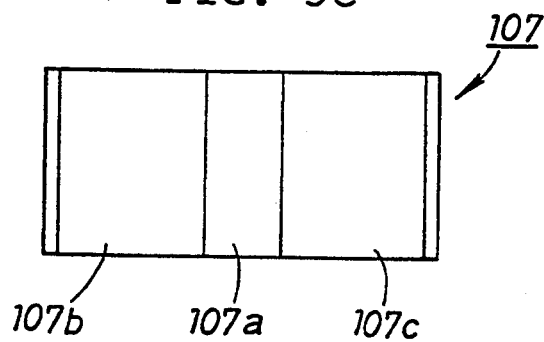
FIG. 5C is a bottom plan view of the spring member shown in FIG. 5A.

The spring member 107 shown in FIGS. 5A, 5B and 5C is made of a rectangular sheet and has three portions 107a, 107b and 107c. The end portions 107b and 107c are slightly inclined down with regard to the middle portion 107a as shown in FIG. 5B. The middle portion 107a is provided with a fixing projection 107d. The fixing projection 107d is inserted in the fixing hole 105j of the case member 105b such that the spring member 107 is fixed to the case member 105b.

The noise absorber 101 with an above-described construction is installed to the flat cable 109 in the following manner.

Initially, the spring member 107 is attached to the case member 105 at the fixing hole 105j. The two ferrite pieces 103 are put in the case members 105a and 105b, respectively, as shown in full lines and dotted lines in FIG. 6A. Subsequently, case 105 is closed in the state that the flat cable 109 is put between the ferrite pieces 103. The sum of the heights of the spring member 107 and the ferrite pieces 103 is larger than that of the heights of the peripheral walls 111 and 112 of the case members 105a and 105b. Therefore, the spring member 107 is deflected such that the sum of the heights of the spring member 107 and the ferrite pieces 103 is equal to that of the heights of the peripheral walls 111 and 112. The case 105 is then closed by means of the engaged members 131 and 133 and the engaging members 135 and 137.

While the case 105 is in the closed state, resiliency or energization is applied to the ferrite pieces 103 due to the tendency of the spring member 107 to regain its original shape. The energization enables the ferrite 103 to form a perfect closed loop because the abutting faces 104a and 104b of the abutting portions 103a and 103b are kept in close contact with each other.

Consequently, the case 105 does not have to press the ferrite pieces 103 against each other but need only be constructed as an accommodation for the ferrite pieces 103 where the abutting planes 104a and 104b are prevented from slipping. Unlike the prior-art electric noise absorber, the case 105 requires no aperture for a biasing member which causes problems such as change of magnetic circuit.

In this embodiment the case 105 and the spring member 107 may be made of different material to fit their own object or may be made of same material, because the spring member 107 is shaped so as to give energization to the ferrite pieces 103, regardless of its material.

Second Embodiment

Figure 7:
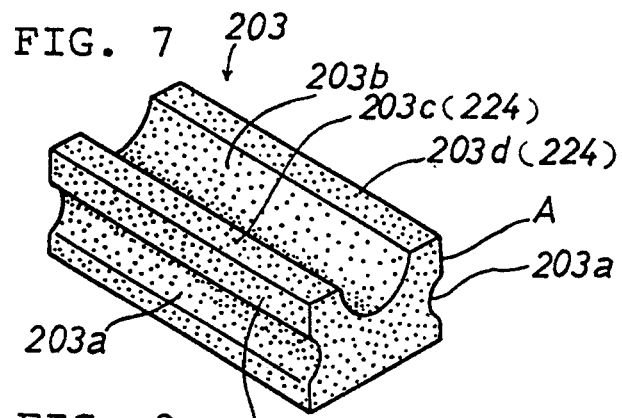
FIG. 7 is a perspective view of a ferrite piece of an electric noise absorber for a second embodiment.
Figure 8:
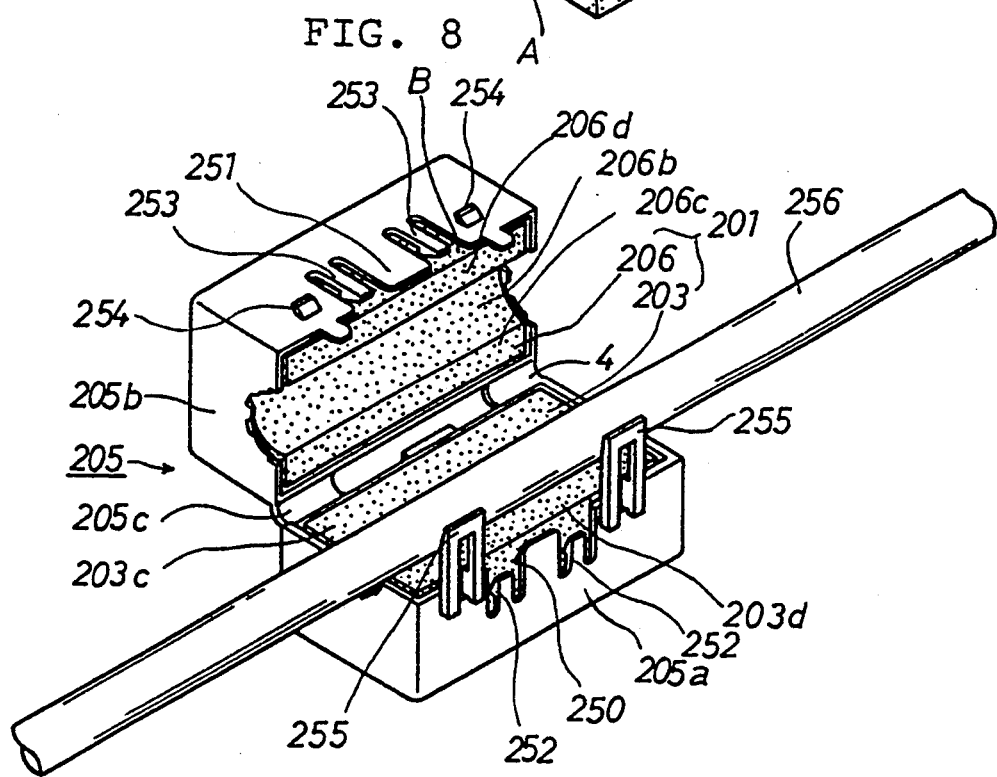
FIG. 8 is a perspective view of the electric noise absorber in the open state for the second embodiment.
Figure 9:
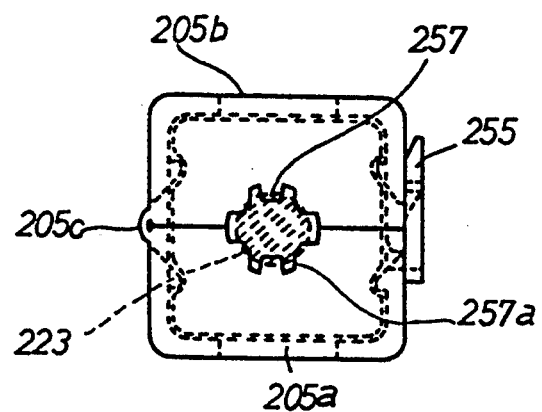
FIG. 9 is a cross-sectional view of the electric noise absorber in the closed state for the second embodiment.

The second embodiment will be now explained based on FIGS. 7 through 9. A noise absorber 201 attenuates electric noise by means of two ferrite pieces 203 and 206 contained in a case 205. Only the ferrite piece 203 is described because the other ferrite piece 206 is identical to the ferrite piece 203. As shown in FIG. 7, the ferrite piece 203 is, as a whole, a rectangular parallelopiped which has, as shown in FIG. 7, a receiving groove 203b on the top surface and a pair of engagement grooves 203a on both sides, all three grooves extending longitudinally. The receiving groove 203b is semicircular in cross section and receives an electric cable 256. A pair of abutting faces 203c and 203d are provided in parallel on both sides of the receiving groove 203b.

In this embodiment magnetic fluid 224 is spread on both abutting planes 203c and 203d. Yet, the magnetic fluid 224 may be applied on a pair of abutting planes 206c and 206d of the other ferrite piece 206, on all abutting planes 203c, 203d, 206c, and 206d, or on the abutting planes 203c of the ferrite piece 203 and the abutting plane 206d of the ferrite piece 206 for example.

The magnetic fluid 224 is stable colloidal solution in which ferromagnetic grains are dispersed in a non-magnetic solution such as water and light oil. The magnetic fluid 224 is deformable and is bestowed with a property to adhere to metallic surfaces of a sealing device even after external pressure or high speed rotation is applied to the magnetic fluid. Further, the magnetic fluid 224 paves the rough abutting planes 203c, 203d, 206c, and 206d, thus making them smooth. The abutting planes 203c, 203d, 206c, and 206d do not have to be polished with expensive diamond abrasive.

The two magnetic pieces 203 and 206 are accommodated in case members 205a and 205b, respectively, which are connected via a hinge 205c. When the ferrite piece 203 is kept in the case member 205a, a side face A interposed between one of the abutting planes 203c and the neighboring engagement groove 203a is held by a holding protrusion 250, and the engagement groove 203a by a pair of engagement protrusions 252. Thus the ferrite piece 203 is secured in the case member 205a. In the same way, the ferrite piece 206 is kept in the case member 205b in the state that a side face B is held by a holding protrusion 251 and a neighboring engagement grooves corresponding to 203a by engagement protrusions 253.

The case member 205a containing the ferrite piece 203 and the case member 205b containing the ferrite piece 206 are closed via the hinge 205c after the electric cable 256 is put on the receiving groove 203b of the ferrite piece 203. Engaging members 255 of the case member 205a engage with engaged members 254 of the case member 205b. The electric cable 256 is thus clamped by the case 205 and supported by teeth 257a, which are interposed between indentations 257 provided at both ends of the case members 205a and 205b. When the case 205 is closed, the receiving grooves 203b and 206b of the ferrite pieces 203 and 206 form a receiving hole 223,through which the electric cable 256 passes.

A plurality of the noise absorbers 201 containing ferrite pieces 203 and 206, when put around the electric cable 256, attenuate electric noise on the electric cable 256 and prevents electric noise from being transmitted.

Third Embodiment

Figure 10:
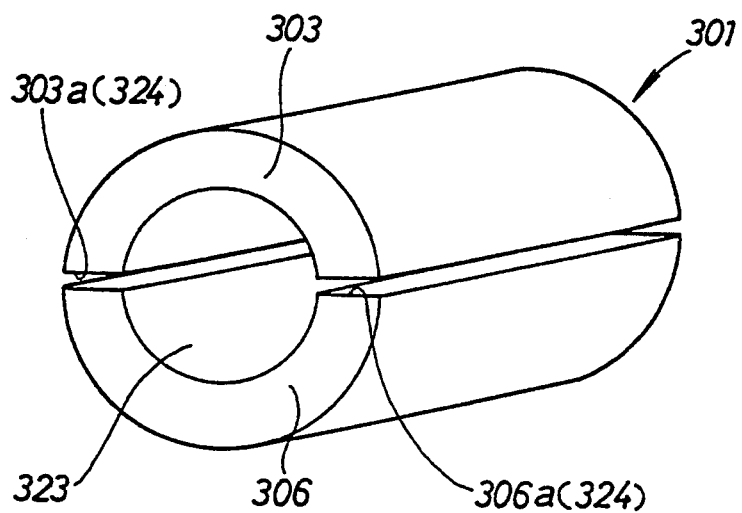
FIG. 10 is a perspective view of ferrite pieces of an electric noise absorber for a third embodiment.

FIG. 10 shows another noise absorber 301 of the third embodiment. The noise absorber 301 comprises two ferrite pieces 303 and 306 which form a circular cylinder having a receiving hole 323 when connected. On both or either of abutting planes 303a of the ferrite piece 303 and abutting planes 306a of the ferrite piece 306, which extend in the longitudinal direction, magnetic fluid 324 is applied.

The ferrite pieces 303 and 306 may be accommodated in an openable case (not shown) similar to the case 205 shown in FIG. 8 and installed on an electric cable by closing the case. Alternatively, the ferrite pieces 303 and 306 may be directly put around and fixed to the electric cable with adhesive tape. The noise absorber 301 produces the same effect as the noise absorber 201 of the second embodiment. Although the ferrite pieces 303 and 306 are in half cylindrical shapes, one third, a quarter or more divided cylindrical shaped ferrite pieces may be also utilized.

Fifth Embodiment

Figure 11:
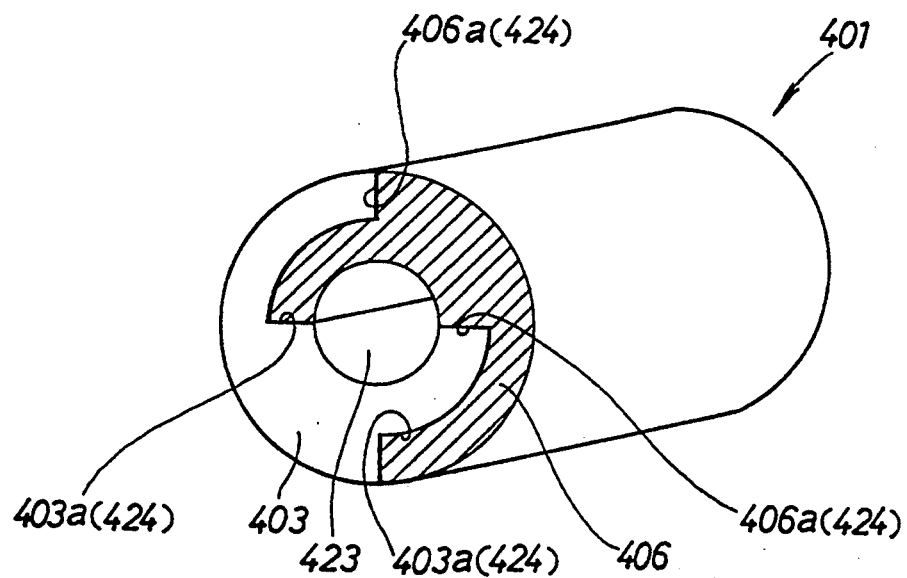
FIG. 11 is a perspective view of ferrite pieces of an electric noise absorber for a fourth embodiment.
Figure 12:
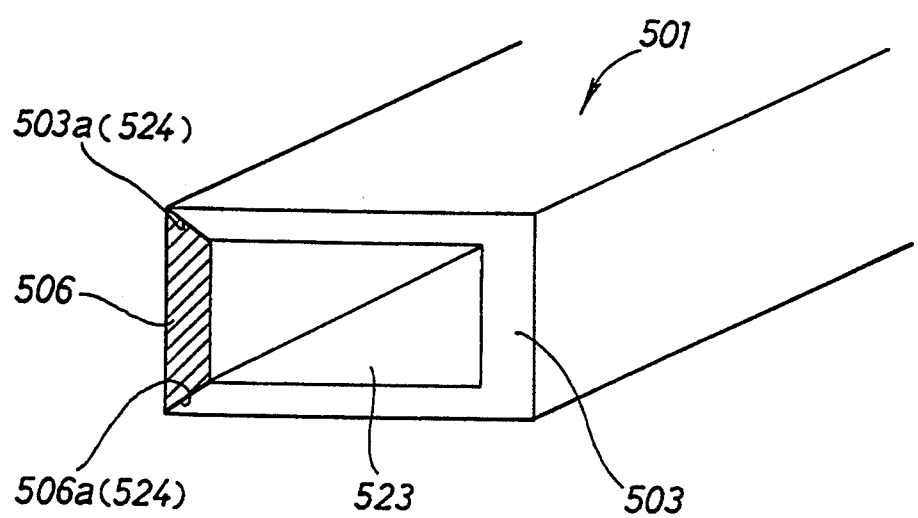
FIG. 12 is a perspective view of ferrite pieces of an electric noise absorber for a fifth embodiment.

As shown in FIG. 11, ferrite pieces 403 and 406 of a noise absorber 401 of the fourth embodiment form a cylinder when closed, like the ferrite pieces 303 and 306 of the third embodiment. However, each of abutting planes 403a and 406a is divided in three portions; two radially partial straight lines perpendicular to each other and a partial circular arc, in cross section. Magnetic fluid 424 is applied to both or either of the abutting planes 403a and 406b. At the radially straight portions of both or either of the abutting planes 403a and 406b, the magnetic fluid 424 is spread with special care such that gaps containing air may not be formed, because the radially straight portions are at right angle to magnetic flux. An electric cable is received in a receiving hole 423. Like in the third embodiment, the ferrite pieces 403 and 406 may be formed to be one third cylindrical shapes or more divided shapes.

The noise absorber 401 attenuates electric noise on the electric cable in such a way that the ferrite pieces 403 and 406 are contained in an openable case (not shown) similar to the case 205 shown in FIG. 8 and installed on the electric cable by closing the case or alternatively the ferrite pieces 403 and 406 are directly fitted onto the electric cable and fixed with adhesive tape. The noise absorber 401 produces the same effects as the noise absorber 201 of the second embodiment.

Fifth Embodiment

In a noise absorber 501 of the fifth embodiment, ferrite pieces 503 and 506 form a rectangular parallelopiped having a rectangular cross section. The ferrite piece 503 is U-shaped in cross section and has abutting planes 503a at free ends. The abutting planes 503a are offset with respect to the legs of the U-shaped ferrite piece 503. The other ferrite piece 506 is a trapezoid in cross section having abutting planes 506a which are offset so as to contact with the abutting planes 503a. The ferrite pieces 503 and 506 surround a space or a receiving hole 523 for an electric cable.

A magnetic fluid 524 is spread on both or either of the abutting planes 503a and 506a. When the ferrite pieces 503 and 506 are closed with the electric cable in the receiving hole 523, the abutting planes 503a and 506a closely adhere to each other owing to the magnetic fluid 524. Consequently, the ferrite pieces 503 and 506 are bestowed with as low impedance as a non-divided ferrite piece, thus efficiently attenuating electric noise on the electric cable.

The ferrite pieces 503 and 506 may be secured in an openable case and put around the electric cable or may be directly attached to the electric cable with adhesive tape.

Sixth Embodiment

Figure 13:
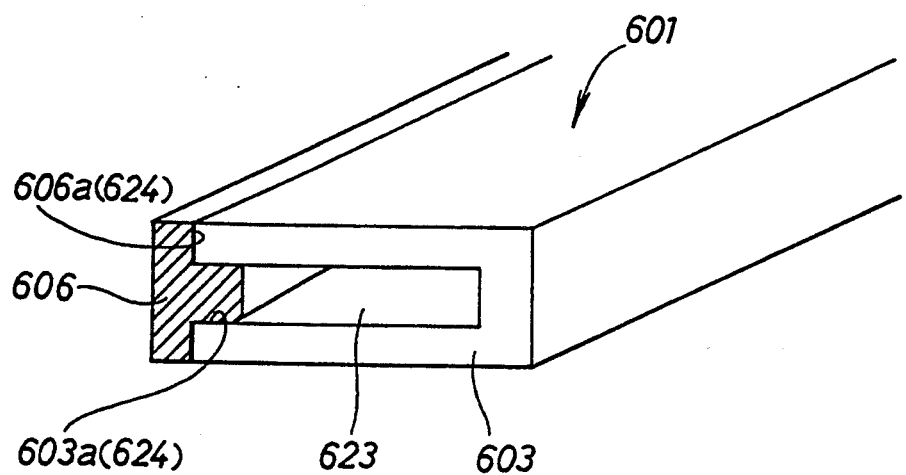
FIG. 13 is a perspective view of ferrite pieces of an electric noise absorber for a sixth embodiment.

A noise absorber 601 of the sixth embodiment is shown in FIG. 13. Ferrite piece 603 is U-shaped and ferrite piece 606 is T-shaped in cross section. The ferrite piece 606 is inserted between the free ends of the ferrite piece 603. The ferrite pieces 603 and 606 are provided with abutting planes 603a and 606a, respectively, and magnetic fluid 624 is applied to both or either of the abutting planes 603a and 606a. Just like the noise absorber 501, the noise absorber 601 efficiently attenuates electric noise on an electric cable passing through a receiving hole 623.

Seventh Embodiment

A noise absorber of a seventh embodiment of the present invention has a structure identical to the structure illustrated in FIGS. 2-6 except that magnetic fluid is spread on both the abutting planes 104 a and 104 b of one of the ferrite pieces 103 as bet shown in FIGS. 3A-3D. Like the noise absorber 101 of the first embodiment, the noise absorber of the seventh embodiment functions to attenuate electric noise on an electric cable.

What is claimed is:

1. An electric noise absorber for attenuating electric noise on an electric cable, the noise absorber comprising:

two bodies of magnetic material movable relative to each other, each magnetic body having an abutment surface which is movable towards and away from the abutment surface of the other magnetic body;

fastening means including (i) lockable engagement means for, when locked, attaching the bodies of magnetic material together around an electric cable with the abutment surfaces facing each other and (ii) means for unlocking the fastening means to detach the bodies of magnetic material from around an electric cable and thereby to allow the abutment surfaces to move away from facing each other; and means comprising a deformable magnetic coating for, when deformed, providing a smooth abutment plane for the abutment surfaces, the deformable magnetic coating including at least one coating on one of the abutment surfaces, the deformable magnetic coating being in contact with both of the abutment surfaces when the abutment surfaces face each other and the bodies of magnetic material are attached together around an electric cable to deform the magnetic coating between the abutment surfaces, the deformable magnetic coating in the form of a nonhardening, liquid colloidal solution which does not change state being in contact with each of the abutment surfaces when the bodies of magnetic material are detached from around an electric cable and the abutment surfaces are moved away from facing each other.

2. An electric noise absorber of claim 1 wherein the deformable magnetic coating is made from a colloidal solution of ferromagnetic grains dispersed in an non-magnetic solution.

3. An electric noise absorber of claim 1 wherein the fastening means further includes two cases members which are relatively movable into a closed position, each of the case members receiving a magnetic body, the case members being retained in their closed position when the engagement means is locked.

4. An electric noise absorber for attenuating electric noise on an electric cable, the noise absorber comprising:

two bodies of magnetic material movable relative to each other, each magnetic body having an abutment surface which is movable towards and away from the abutment surface of the other magnetic body;

fastening means including (i) lockable engagement means for, when locked, attaching the bodies of magnetic material together around an electric cable with the abutment surfaces facing each other and (iii) means for unlocking the means for unlocking the engagement means to detach the bodies of magnetic material from around an electric cable and thereby to allow the abutment surfaces to move away from facing each other;

a first deformable magnetic coating including at least one coating on one of the abutment surfaces; and a second deformable magnetic coating separate from the first magnetic coating and including at least one coating on the other one of the abutment surfaces;

the first and second deformable magnetic coatings being in contact with each other and deforming to provide a smooth abutment plane for the abutment surfaces when the abutment surfaces face each other and the bodies of magnetic material are attached together around an electric cable, the first and second deformable magnetic coatings in the form of a nonhardening, liquid colloidal solution which does not change state and being spaced apart from each other when the bodies of magnetic material are detached from around an electric cable and the abutment surfaces are moved away from facing each other.

5. An electric noise absorber of claim 4 wherein the first and second deformable magnetic coatings are made from a colloidal solution of ferromagnetic grains dispersed in a non-magnetic solution.

6. An electric noise absorber of claim 4 wherein the fastening means further includes two case members which are relatively movable into a closed position, each of the case members receiving a magnetic body, the case members being retained in their closed position when the engagement is locked.

* * * * *

UNITED STATES PATENT AND TRADEMARK OFFICE
CERTIFICATE OF CORRECTION

PATENT NO. : 5,343,184
DATED : August 30, 1994
INVENTOR(S) : Kazuhiro Matsui and Hiroji Kitagawa It is certified that error appears in the above-indentified patent and that said Letters Patent is hereby corrected as shown below:

Column 8, line 17, change "an" to --a--.

Column 8, line 20, change "cases" to --case--.

Column 8, line 37, change "(iii)" to --(ii)--.

Signed and Sealed this

Fourth Day of July, 1995

Attest:

BRUCE LEHMAN

Attesting Officer          Commissioner of Patents and Trademarks